United States Patent
Dyer

(10) Patent No.: US 7,324,860 B2
(45) Date of Patent: Jan. 29, 2008

(54) METHOD, APPARATUS AND PROGRAM STORAGE DEVICE FOR PROVIDING A CASCADING TIMELINE OF MANUFACTURING EVENTS LEADING TO COMPLETION OF A MANUFACTURED PRODUCT

(75) Inventor: Richard Clinton Dyer, Scotts Valley, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/079,789

(22) Filed: Mar. 14, 2005

(65) Prior Publication Data
US 2006/0206222 A1  Sep. 14, 2006

(51) Int. Cl.
*G06F 19/00* (2006.01)
(52) U.S. Cl. ............................ 700/97; 700/17; 715/961
(58) Field of Classification Search ............... 700/8, 700/17, 18, 83, 95–97, 99–102; 705/7–10, 705/22, 28; 715/961–966
See application file for complete search history.

(56) References Cited

U.S. PATENT DOCUMENTS

| | | | |
|---|---|---|---|
| 6,023,453 A * | 2/2000 | Ruutu et al. ................. 370/229 |
| 6,370,520 B1 * | 4/2002 | Ruutu et al. ................. 707/1 |
| 6,970,756 B2 * | 11/2005 | Levionnois .................. 700/99 |
| 7,072,723 B2 * | 7/2006 | Kohn et al. .................. 700/28 |
| 2002/0178077 A1 * | 11/2002 | Katz et al. .................. 705/26 |
| 2002/0188499 A1 * | 12/2002 | Jenkins et al. ............... 705/10 |
| 2003/0033179 A1 * | 2/2003 | Katz et al. .................. 705/7 |
| 2003/0088449 A1 * | 5/2003 | Menninger ................... 705/8 |
| 2003/0236718 A1 * | 12/2003 | Yang et al. .................. 705/28 |
| 2004/0073472 A1 * | 4/2004 | Sakuma et al. ............... 705/8 |
| 2004/0093101 A1 * | 5/2004 | Torii et al. .................. 700/95 |
| 2004/0153359 A1 * | 8/2004 | Ho et al. ..................... 705/10 |
| 2004/0186606 A1 * | 9/2004 | Levionnois ................. 700/106 |
| 2004/0210489 A1 * | 10/2004 | Jackson et al. .............. 705/22 |
| 2004/0254842 A1 * | 12/2004 | Kirkegaard .................. 705/22 |
| 2005/0021425 A1 * | 1/2005 | Casey ........................ 705/28 |
| 2005/0075949 A1 * | 4/2005 | Uhrig et al. ................. 705/28 |
| 2005/0102044 A1 * | 5/2005 | Kohn et al. .................. 700/28 |
| 2005/0137732 A1 * | 6/2005 | Chao et al. ................. 700/100 |
| 2005/0240668 A1 * | 10/2005 | Rolia et al. ................. 709/223 |
| 2006/0173661 A1 * | 8/2006 | Kohn et al. .................. 703/2 |

* cited by examiner

*Primary Examiner*—Maria Von Buhr
(74) *Attorney, Agent, or Firm*—David W. Lynch; Merchant & Gould

(57) ABSTRACT

A method, apparatus and program storage device for providing a cascading timeline of manufacturing events leading to completion of a manufactured product is disclosed. A cascading timeline, or waterfall chart, is updated and distributed weekly to provide week-to-week analysis for supply increase activities, week to week analysis for excess inventory solutions and consolidation of supply issue factor by product by week.

26 Claims, 5 Drawing Sheets

METHOD, APPARATUS AND PROGRAM STORAGE DEVICE FOR PROVIDING A CASCADING TIMELINE OF MANUFACTURING EVENTS LEADING TO COMPLETION OF A MANUFACTURED PRODUCT

FIELD OF THE INVENTION

This disclosure relates in general to a manufacturing processes, and more particularly to a method, apparatus and program storage device for providing a cascading timeline of manufacturing events leading to completion of a manufactured product.

BACKGROUND

In today's competitive marketplace, companies exert great focus and effort in improving leadership, quality, customer satisfaction and other factors that can provide an edge over the competition. One area of focus involves the production planning for a manufacturing line. Conventional production planning for a manufacturing line, including the planning for the input/delivery quantities into/from a plurality of manufacturing areas, is usually made on the basis of past records, e.g., average term of works, average operation rate, average number of lots processed per equipment, etc. However, if a future product mix, supply, demand, component deliver or the like is altered, the existing forecasting is no longer valid and must be reassessed. Therefore, in order to provide an accurate forecast, the planning and updating of all aspects of production is needed.

Manufacturing line resource planning is a tool that is used to resolve scheduling conflicts before they occur. With the right tools, dramatic improvements in productivity are possible. Various methods for making production plans have been conventionally developed, as a production management system. For example, computerized MRP systems give manufacturers tremendous advantages by minimizing inventory and reducing material shortages. In addition to materials management, capacity on the manufacturing line is also important to monitor. Capacity Requirements Planning (CRP) helps managers make the right scheduling decisions before problems reach the manufacturing line. By performing capacity planning, over-loading or under-scheduling critical resources may be avoided.

Typically, capacity planning subsystems provide convenient reports to help managers make the right scheduling decision before problems reach the manufacturing line. Capacity planning often considers forecasts, customer orders, and firm planned orders for each time period in the planning horizon. Load details may be accumulated in standard hours and the total loads are compared to each capacity choke-point. Projected surplus or shortfalls provide the basis for taking corrective action.

Capacity planning reports are synchronized with the latest manufacturing resource planning, which helps assure coordination between materials and resources. This enables the identification of potential conflict s in sufficient time to reschedule work orders, manage manpower, select or develop alternate routings, modify subcontracting plans, or take a host of other corrective actions without costly interruptions to work on the manufacturing line.

Input/output planning is used to identify short-term problems. Desired levels of planned input are generated, and reports are generated that highlight variances from the desired levels. Further, historic information allows improved control of manufacturing operations through variance reports of input, output, and queues.

The monitoring of activity control helps handle the details of work order flow. This allows managers to track manufacturing line processes in numerous ways; by monitoring work order movement and managing manufacturing priorities. The cycle time for each step in the production process must be monitored and managed to plan and control manufacturing operations more effectively. Once all operations are scheduled and material has been delivered to the appropriate manufacturing areas, work order and work center status tracking may be performed.

Material Requirements Planning (MRP) is widely recognized as one of the most important management tools a manufacturing management can have. MRP translates management, marketing, and productions planning goals into detailed and coordinated schedules for purchasing and production. MRP is used to translate management, marketing, and production planning goals into detailed and coordinated schedules for purchasing and production. In addition to monitoring all of the above parameters, accurate records of parts on-hand and material flow through the stockroom are valuable to manage inventory availability. Accurate inventory records are crucial to the success of the planning effort.

Thus, the fundamental objective of a manufacturing system is to support the factory's ability to produce a finished product by ensuring the availability of the right material in the right quantity at the right time. Such accurate, complete, and timely information help achieve business objectives more effectively, even as changes occur in markets and production schedules. Knowing how well production continues to match demand, as weeks and months go by, allows management to smooth production, lower costs, shorten lead times and speed shipments.

However, the customer needs completed products that meet their requirements at a hub or warehouse close to the manufacturing site for the pull production. A manufacturer is requested to deliver the completed product to the hub. Nevertheless, the delivery is determined according to supply commitment from the manufacturing. The monitoring processes provide monthly indications of demand and supply commitment processes. However, reporting supply commitment is not reliably communicated timely and/or to the proper responsible party thereby preventing action from being taken when achievement of the commitment is not possible.

In addition, when supply is short against demand, management is directed to chase the shortage. However, reporting is of supply and demand mismatches are not sufficient to adjust manufacturing operations to compensate for such mismatches. Most of demand changes cause management to chase component and set up capacity at manufacturing to resolve the issues. These efforts, i.e., chase and setting up, are not coordinated to allow sharing of the latest status of component parts and capacity. Still further, immediate erosion of demand can cause extra inventory for the manufacturer. To solve the excess manufacturing inventory, an action plan for absorbing the extra inventory must be implemented as soon as the excess is detected.

Accordingly, existing systems do not provide timely analysis of supply increase activities or excess inventory. There is also no consolidation of supply issue factors according to product that would enable appropriate management action to be initiated.

It can be seen then that there is a need for a method, apparatus and program storage device for providing a cascading timeline of manufacturing events leading to completion of a manufactured product.

SUMMARY OF THE INVENTION

To overcome the limitations in the prior art described above, and to overcome other limitations that will become apparent upon reading and understanding the present specification, the present invention discloses a method, apparatus and program storage device for providing a cascading timeline of manufacturing events leading to completion of a manufactured product.

The present invention solves the above-described problems by updating weekly and distributing a cascading timeline, or waterfall chart, to provide week to week analysis for supply increase activities, week to week analysis for excess inventory solutions and consolidation of supply issue factor by product by week.

In one embodiment of the present invention, a method for providing a cascading timeline of manufacturing events leading to completion of a manufactured product is provided. The method includes centrally gathering data related to demand of a product, supply commitment associated with the product and current product inventory and producing a cascading timeline of manufacturing events based upon the centrally gathered data related to demand of a product, supply commitment associated with the product and current product inventory.

In another embodiment of the present invention, a cascading timeline of manufacturing events leading to completion of a manufactured product is provided. The cascading timeline includes a product forecast having weekly elements for predicting capacity and yield information and monthly component gating, the monthly component gating allowing comparison of component capacity to product quantity by month.

In another embodiment of the present invention, a system for producing a cascading timeline of manufacturing events leading to completion of manufactured product is provided. The system includes a database of information relating to demand of a product, supply commitment associated with the product and current product inventory and a management tool for producing a cascading timeline of manufacturing events leading to completion of manufactured product based upon information retrieved from the database, the cascading timeline updated weekly by the management tool.

In another embodiment of the present invention, a program storage device having program instructions executable by a processing device to perform operations for producing a cascading timeline of manufacturing events leading to completion of manufactured product is provided. The operations provided by the program storage device includes centrally gathering data related to demand of a product, supply commitment associated with the product and current product inventory and producing a cascading timeline of manufacturing events based upon the centrally gathered data related to demand of a product, supply commitment associated with the product and current product inventory.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for providing a cascading timeline of manufacturing events leading to completion of a manufactured product. The cascading timeline, or waterfall chart, is used to provide week-to-week analysis for supply increase activities, week-to-week analysis for excess inventory solutions and consolidation of supply issue factor by product by week. Data related to demand of a product, supply commitment associated with the product and current product inventory is centrally gathered. A cascading timeline of manufacturing events is produced based upon the centrally gathered data related to demand of a product, supply commitment associated with the product and current product inventory. The produced cascading timeline is updated weekly and distributed to a product volume planner, to manufacturing central and to a manufacturing site manufacturing the product.

Figure 1:
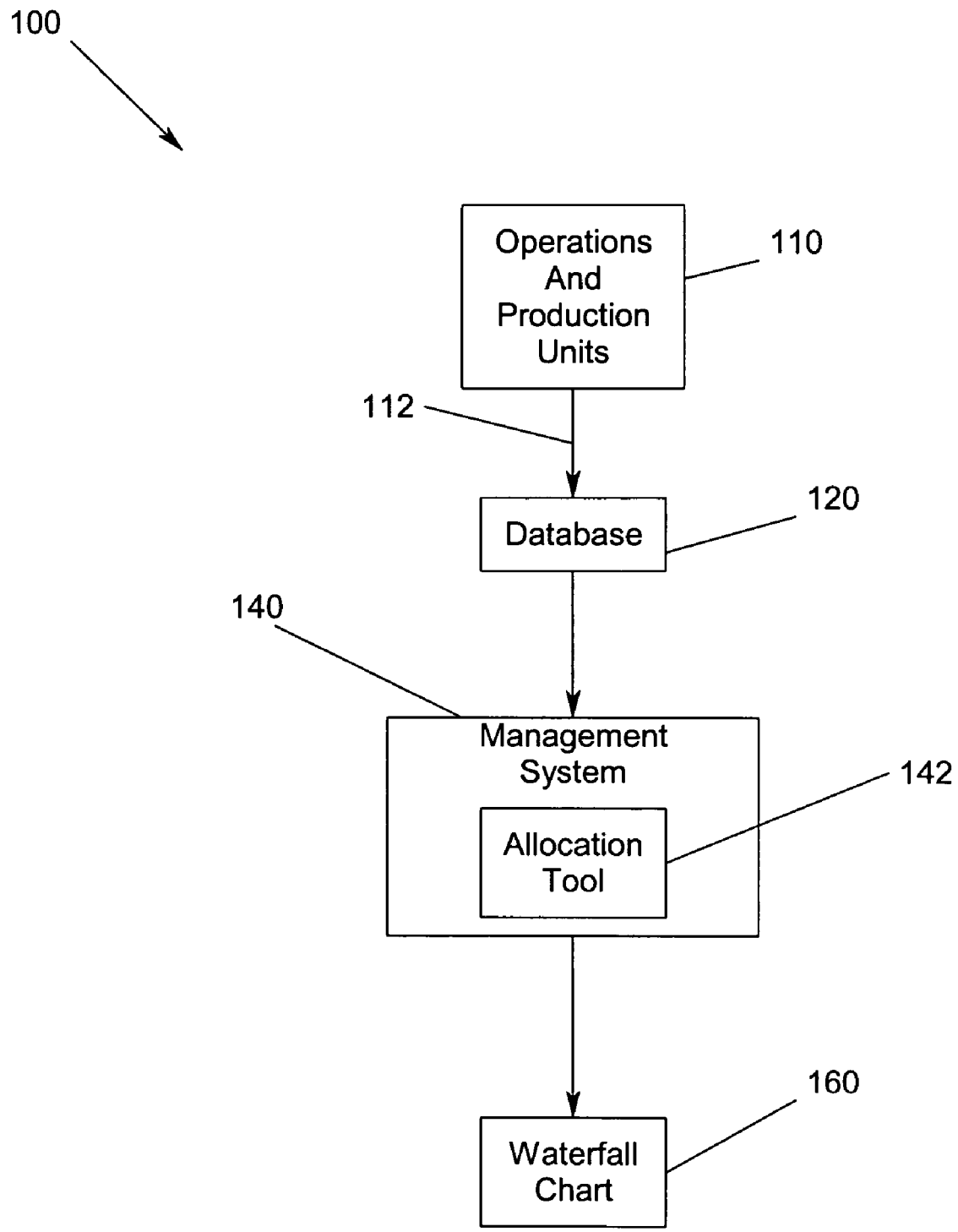
FIG. 1 illustrates a system for producing a cascading timeline of manufacturing events leading to completion of manufactured product according to an embodiment of the present invention.

FIG. 1 illustrates a system 100 for producing a cascading timeline of manufacturing events leading to completion of manufactured product according to an embodiment of the present invention. In FIG. 1, data 112 from units 110, such as operation and production units, is provided to a central database 120. A management system 140 uses the data from the database 120 to process supply commitments, product demand, e.g., through sales orders, capacity and allocations. Allocations may be made using an allocation tool 142. Once the data from the database 120 is processed by the management system 140, a waterfall chart 160 of manufacturing events leading to completion of a manufactured product is produced. The centrally gathered data 112 related to demand of a product permits identification of erosion of demand to allow excess inventory to be absorbed. The cascading timeline/waterfall chart 160 is updated and distributed weekly. Thus, capacity issues, excess inventory conditions, etc. may be communicated to the proper personnel where the situation may be addressed in a timely manner to ensure appropriate production of the product.

Figure 2:
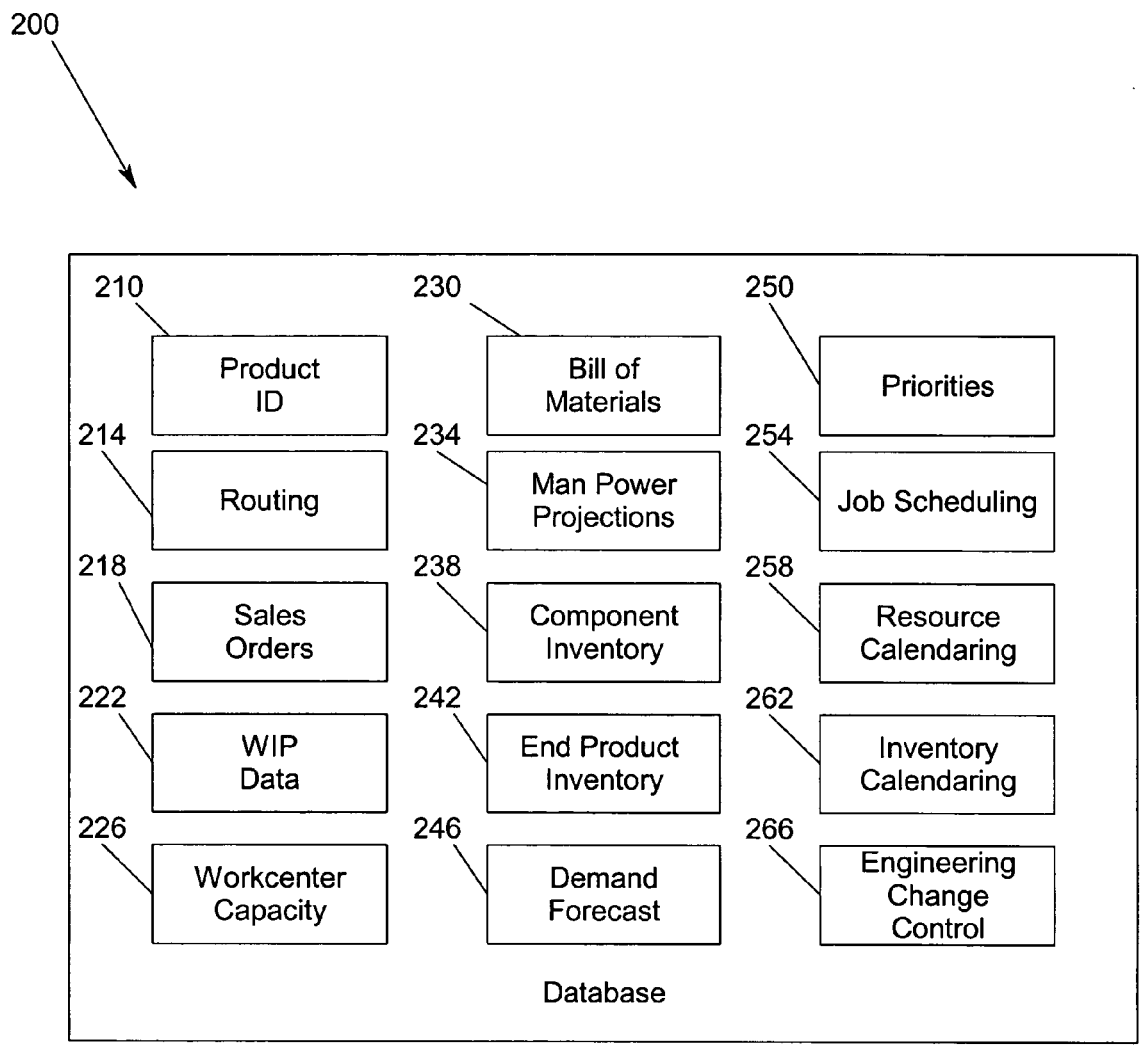
FIG. 2 illustrates a database having a plurality of data sets for use in producing a cascading timeline of manufacturing events leading to completion of manufactured product according to an embodiment of the present invention.

FIG. 2 illustrates a database 200 having a plurality of data sets for use in producing a cascading timeline of manufacturing events leading to completion of manufactured product according to an embodiment of the present invention. In FIG. 2, records in the database include product Ids 210, component routing 214, sales orders 218, WIP data 222, workcenter capacity 226, bill of materials used for production of the product 230, man power projections 234, component inventory 238, end product inventory 242, demand forecasts 246, priorities 250, job scheduling 254, resource calendaring 258, inventory calendaring 262 and engineering change control 266. While fifteen data sets 210-266 are shown in the database 200 of FIG. 2, those skilled in the art will recognize that the present invention is not meant to be limited to the data sets 210-266 shown in FIG. 2. Rather, the present invention may include fewer or additional data sets. Moreover, the type of data sets may differ from the data sets 210-266 illustrated in FIG. 2.

Figure 3:
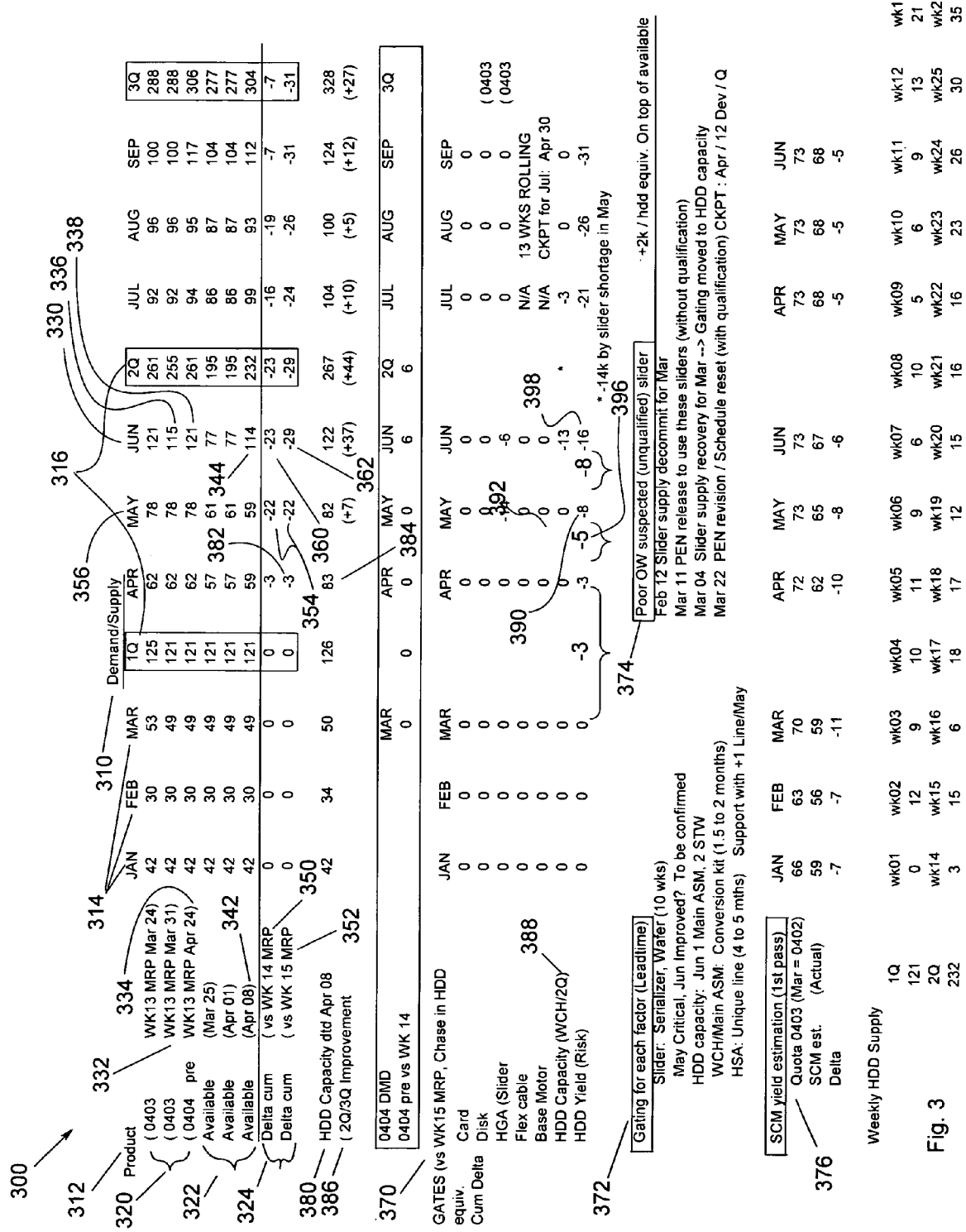
FIG. 3 illustrates a cascading timeline of manufacturing events leading to completion of manufactured product according to an embodiment of the present invention.

FIG. 3 illustrates a cascading timeline of manufacturing events 300 leading to completion of manufactured product according to an embodiment of the present invention. In FIG. 3, demand/supply numbers 310 associated with a product 312 are displayed. The demand/supply numbers 310 are displayed monthly 314 and with quarterly totals 316. Further, the demand/supply numbers 310 are provided based upon weekly forecasts 320 and actual available numbers 322. The product forecast 320 are based upon weekly numbers that allow prediction of capacity and yield information.

A cumulative sum 324 is provided also to illustrate trends. For example, with reference to the June 330 demand/supply numbers, week 14 332 and week 15 334 numbers are 115 336 and 121 338 respectively. The actual numbers for June 330 based upon April 08 data 342 indicate a target of 114 344. Thus, the week 14 number 332 of 115 336 is off by −1. The week 15 number 334 of 121 338 is off by −7. These deltas are added to the week 14 cumulative numbers 350 and week 15 cumulative numbers 352 for May 356, which are both −22 354. Thus, the week 14 cumulative numbers 350 and week 15 cumulative numbers 352 for June 330 are −23 360 and −29 362 respectively.

FIG. 3 also shows monthly component gating 370 that allows a comparison of component capacity to product quantity by month. The forecasts for the product 312 and monthly component gating 370 are updated weekly. Information associated with identified critical factors affecting satisfaction of supply commitment to demand 372 and information associated with unqualified products 374 are also provided. Weekly yield estimations 376 allow problems to be chased.

Accordingly, the cascading timeline 300 provides week-to-week analysis for supply increase activities, week-to-week analysis for excess inventory solutions and consolidation of supply issue factor by product by week. The cascading timeline 300 is published by product by manufacturing segment, i.e., site, to share demand supply status among product volume planners (PVP), manufacturing central and manufacturing sites. The data is centrally coordinated. The information is to form the cascading timeline 300 may include demand chronology on a month/quarterly basis, supply(Availability) chronology on a month/quarterly basis, component gating by HDD equivalent quantity on a monthly basis, yield information (when applicable), capacity information (when applicable) and weekly spread of supply commitment (Availability). Using the published cascading timeline 300, weekly telephone conferences may be made by management to allow elaboration and direction.

For example, product capacity for April 08 380 is derived using 3000 units End ISO at Mar 382 with April product capacity of 60,000 units (not shown) to show the total product capacity forecast for April 384. The 2Q/3Q improvement 386 reflects a delta between second quarter capacity and third quarter capacity. The capacities are based upon data in the database 200 described with reference to FIG. 2.

In FIG. 3, an example of product capacity results 388, HDD capacity (WCH/2Q), is shown. With −22K shortage 354 in May 356, 143K units are needed in June. Thus, the delta between 143K and the June capacity of 121K 338 was 22K 354. However, since each cell in "HDD capacity" row was set to pick up previous month delta of HDD capacity itself and each previous month delta of other gatings, May HDD capacity was manually overwritten with 0 390 because of the capacity recovery at the end. The June capacity shortage, as a result, was shown only −14 (HGA of May) 392 −5 (HDD yield of May) 396=−19.

In FIG. 3, an example of product yield results, HDD Yield (Risk), is shown. HDD yield impact of each month is shown as being −3/−5/−8 for a total −16 398 in the second quarter. This impact was (HDD capacity)*(Yield impact estimate) and approximately 3K End ISO at Mar/E for Apr. The small difference is a result of a rounding error as the waterfall chart does not show the number after the decimal point.

Figure 4:
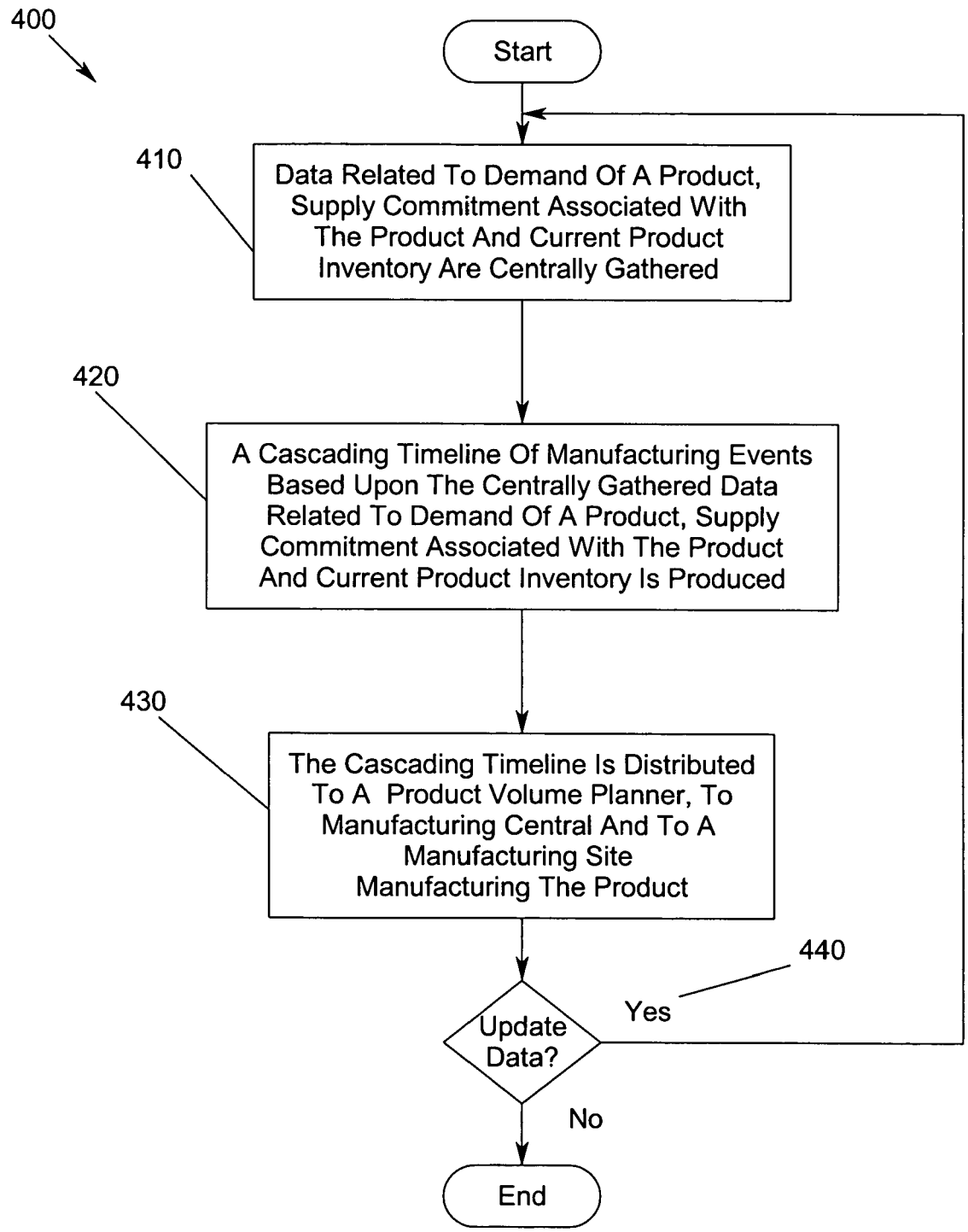
FIG. 4 is a flow chart of a method for producing a cascading timeline of manufacturing events leading to completion of manufactured product according to an embodiment of the present invention.

FIG. 4 is a flow chart 400 of a method for producing a cascading timeline of manufacturing events leading to completion of manufactured product according to an embodiment of the present invention. In FIG. 4, data related to demand of a product, supply commitment associated with the product and current product inventory are centrally gathered 410. A cascading timeline of manufacturing events based upon the centrally gathered data related to demand of a product, supply commitment associated with the product and current product inventory is produced 420. The centrally gathered data related to demand of a product permits identification of erosion of demand to allow excess inventory to be absorbed. The cascading timeline is distributed to a product volume planner, to manufacturing central and to a manufacturing site manufacturing the product 430. The cascading timeline is updated and distributed weekly 440.

The centrally gathered data related to supply commitment enables identification of a bottleneck in manufacturing the product, e.g., identifying production of a component of the product that does not allow supply commitment of the product to meet demand for the product, and adjustment of capacity for relieving the bottleneck. The adjustment of capacity for relieving the bottleneck may include increasing capacity for the component of the product identified as not allowing supply commitment of the product to meet demand for the product. The centrally gathered data may include demand chronology, supply chronology and component gating by product equivalent quantity. The centrally gathered data may also include yield information, capacity information and weekly spread of supply commitment. The product may be a hard disk drive.

Figure 5:
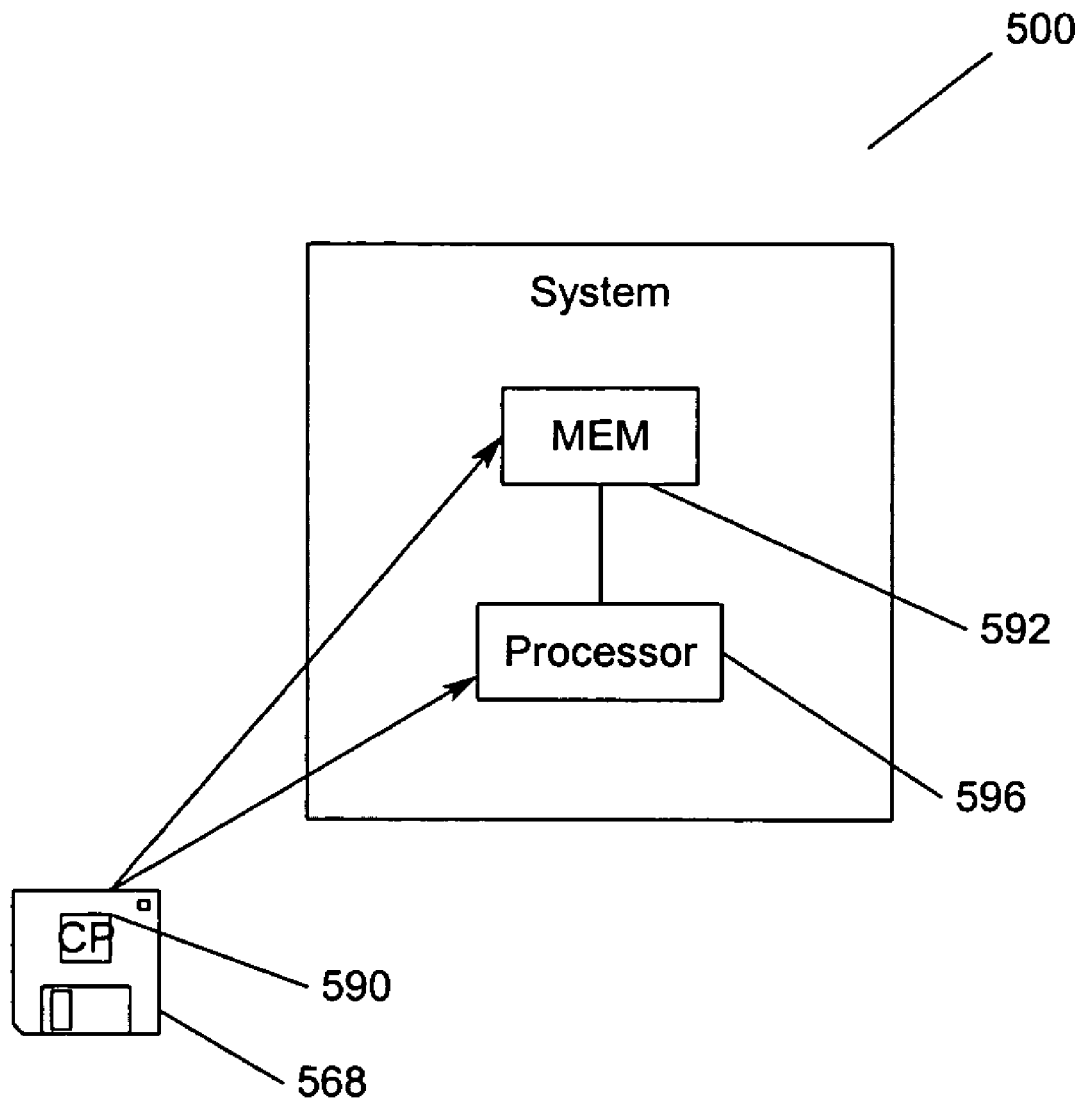
FIG. 5 illustrates a system and program storage device tangibly embodying the operations for providing a cascading timeline of manufacturing events leading to completion of a manufactured product according to an embodiment of the present invention.

FIG. 5 illustrates a system 500 according to the present invention, wherein the process illustrated with reference to FIGS. 1-4 may be tangibly embodied in a computer-readable medium or carrier, e.g. one or more of the fixed and/or removable data storage devices 568 illustrated in FIG. 5, or other data storage or data communications devices. A computer program 590 expressing the processes embodied on the removable data storage devices 568 may be loaded into the memory 592 or into the processor 596 to configure the system 500 of FIG. 5 for execution. The computer program 590 comprise instructions which, when read and executed by the system 500 of FIG. 5, causes the system 500 to perform the steps necessary to execute the steps or elements of the present invention The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus, comprising:
a storage device for centrally organizing and storing data from operation and production units during manufacturing of at least one product, the data being periodically updated to reflect periodically updated status of operations and production units; and
a processor, coupled to the storage device, for processing the periodically updated data reflecting periodically updated status of operations and productions units and supply commitments, product demand, capacity and allocations derived from the periodically updated data stored in the storage device to produce a visual display of periodically updated of text and numbers reflecting demand and supply numbers associated with manufacturing events occurring during the manufacture of the at least one product, wherein the visual display includes an initial date and an end date that spans a fixed length of time, wherein the visual display is updated periodically and the fixed length of time slides by moving the initial date and the end date to provide a periodically updated visual display of text and numbers for supporting a correction to supply and capacity mismatches during the manufacturing of the at least one product.

2. The apparatus of claim 1, wherein the fixed length of time slides by moving the initial date and the end date monthly.

3. The apparatus of claim 1, wherein the visual display is updated weekly.

4. The apparatus of claim 1, wherein the data from operation and production units stored in the storage device comprises work-in-process data, work center capacity, component inventory, end product inventory and demand forecasts.

5. The apparatus of claim 4, wherein the data from operation and production units stored in the storage device further comprises product IDs, component routing, sales orders, bill of materials used for production of the product, man power projections, priorities, job scheduling, resource calendaring, inventory calendaring and engineering change control.

6. The apparatus of claim 1, wherein the visual display further comprises ef monthly component gating for comparing component capacity to product quantity.

7. The apparatus of claim 1, wherein the visual display includes demand and supply numbers displayed according to month with quarterly totals.

8. The apparatus of claim 1, wherein the visual display includes demand and supply numbers displayed according to weekly forecasts and actual available numbers.

9. The apparatus of claim 1, wherein the visual display includes a display of information associated with identified critical factors occurring during the manufacture of the at least one product affecting satisfaction of supply commitment to demand and information associated with unqualified products.

10. The apparatus of claim 1, wherein the visual display includes a display of weekly yield estimations to identify whether management needs to address a supply or demand issue.

11. The apparatus of claim 1, wherein the processor produces the visual display according to product and manufacturing site, the visual display produced according to product and manufacturing site provides demand and supply status among product volume planners, manufacturing central and manufacturing sites.

12. The apparatus of claim 1, wherein the visual display produced by the processor includes demand chronology on a month and quarterly basis, supply chronology on a month and quarterly basis, component gating by product quantity on a monthly basis, yield information, capacity information and weekly spread of supply commitment.

13. A computer program product embodied on or in a computer readable medium for causing a computer to execute program instructions that result in the computer executing a method of managing manufacturing events leading to completion of a manufactured product, the method comprising:
centrally organizing and storing data from operation and production units during manufacturing of at least one product;
periodically updating the stored data to reflect periodically updated status of operations and production units;
processing the periodically updated data reflecting periodically updated status of operations and productions units and supply commitments, product demand, capacity and allocations derived from the periodically updated data stored in the storage device; and
in response to the processing, producing a visual display of periodically updated of text and numbers reflecting demand and supply numbers associated with manufacturing events occurring during the manufacture of the at least one product, wherein the visual display includes an initial date and an end date that spans a fixed length of time, wherein the visual display is updated periodically and the fixed length of time slides by moving the initial date and the end date to provide a periodically updated visual display of text and numbers for supporting a correction to supply and capacity mismatches during the manufacturing of the at least one product.

14. The computer program product of claim 13, wherein the producing a visual display further comprises sliding the fixed length of time by moving the initial date and the end date monthly.

15. The computer program product of claim 13 further comprising updating the visual display weekly.

16. The computer program product of claim 13, wherein the storing data from operation and production units in the storage device comprises storing work-in-process data, work center capacity, component inventory, end product inventory and demand forecasts.

17. The computer program product of claim 16 wherein the storing data from operation and production units in the storage device further comprises storing product IDs, component routing, sales orders, bill of materials used for production of the product, man power projections, priorities, job scheduling, resource calendaring, inventory calendaring and engineering change control.

18. The computer program product of claim 13, wherein the producing the visual display further comprises producing a visual display that includes monthly component gating for comparing component capacity to product quantity.

19. The computer program product of claim 13 further comprising producing a visual display that includes demand and supply numbers displayed according to month with quarterly totals.

20. The computer program product of claim 13 further comprising producing a visual display that includes demand and supply numbers displayed according to weekly forecasts and actual available numbers.

21. The computer program product of claim 13 further comprising producing a visual display that includes a display of information associated with identified critical factors occurring during the manufacture of the at least one product affecting satisfaction of supply commitment to demand and information associated with unqualified products.

22. The computer program product of claim 13 further comprising producing a visual display that includes a display of weekly yield estimations to identify whether management needs to address a supply or demand issue.

23. The computer program product of claim 13, wherein the producing the visual display further comprises producing the visual display according to product and manufacturing site the visual display produced according to product and manufacturing site provides demand and supply status among product volume planners, manufacturing central and manufacturing sites.

24. The computer program product of claim 13 further comprising producing a visual display that includes demand chronology on a month and quarterly basis, supply chronology on a month and quarterly basis, component gating by product quantity on a monthly basis, yield information, capacity information and weekly spread of supply commitment.

25. A method of managing manufacturing events leading to completion of a manufactured product, comprising:

centrally organizing and storing data from operation and production units during manufacturing of at least one product;

periodically updating the stored data to reflect periodically updated status of operations and production units;

processing the periodically updated data reflecting periodically updated status of operations and productions units and supply commitments, product demand, capacity and allocations derived from the periodically updated data stored in the storage device; and in response to the processing, producing a visual display of periodically updated of text and numbers reflecting demand and supply numbers associated with manufacturing events occurring during the manufacture of the at least one product, wherein the visual display includes an initial date and an end date that spans a fixed length of time, wherein the visual display is updated periodically and the fixed length of time slides by moving the initial date and the end date to provide a periodically updated visual display of text and numbers for supporting a correction to supply and capacity mismatches during the manufacturing of the at least one product.

26. An apparatus, comprising:

means for centrally organizing and storing data from operation and production units during manufacturing of at least one product, the data being periodically updated to reflect periodically updated status of operations and production units;

means, coupled to the means for centrally organizing and storing, for processing the periodically updated data reflecting periodically updated status of operations and productions units and supply commitments, product demand, capacity and allocations derived from the periodically updated data stored in the storage device to produce a visual display of periodically updated of text and numbers reflecting demand and supply numbers associated with manufacturing events occurring during the manufacture of the at least one product, wherein the visual display includes an initial date and an end date that spans a fixed length of time, wherein the visual display is updated periodically and the fixed length of time slides by moving the initial date and the end date to provide a periodically updated visual display of text and numbers for supporting a correction to supply and capacity mismatches during the manufacturing of the at least one product.

* * * * *